United States Patent Office 3,015,570
Patented Jan. 2, 1962

3,015,570
PLASTICIZED THERMOPLASTIC COMPOSITION CONTAINING DI(DINITROPHENYL)-R-GLYCOL ETHER
Norman J. Bowman, Hammond, Ind., and Wayne A. Proell, Chicago, Ill., assignors to Standard Oil Company, Chicago, Ill., a corporation of Indiana
No Drawing. Filed Sept. 24, 1957, Ser. No. 686,811
4 Claims. (Cl. 106—181)

This invention relates to a plasticizer for polymers.

In the field of solid propellants based on ammonium nitrate as the oxidizer, binders are used to permit the formation of shaped grains. For reasons of economy of manufacture, it is desirable that the grain have qualities which permit formation by extrusion. In order to attain this end polymeric materials are combined with plasticizers to produce thermoplastic compositions which can be combined with the ammonium nitrate to form plastic masses at temperatures of about 100° C. Not only must the plasticizers be excellent materials for softening polymers such as cellulose esters and polyvinyl chloride but also the plasticizers must not upset the oxygen balance of the propellant.

An object of the invention is a plasticizer suitable for use with organic polymeric materials. A particular object is a thermoplastic composition of an organic polymer and plasticizers suitable for manufacture of ammonium nitrate-type solid propellants. Other objects will be apparent in the course of the detailed description.

The plasticizer of the invention consists essentially only of di(dinitrophenyl)-R-glycol ether wherein R is either propylene or dipropylene, for example di(dinitrophenyl) propylene glycol ether.

The defined ether is a suitable plasticizer for many organic polymers: The cellulose esters of acetic acid, propanoic acid and butyric acid, including the mixed esters; examples of these are cellulose acetate, cellulose butyrate, and cellulose acetate propionate. The polyvinyl polymers namely, polyvinyl butyral, polyvinyl chloride, and polyvinyl acetate, polyacrylonitrile, and polystyrene. The co-polymer of styrene and acrylonitrile. For the purposes of this disclosure petroleum asphalt is defined as an organic polymer. The asphalts may be those naturally occurring or obtainable by distillation from crude oil or by propane precipitation from crude oil. Also the asphalts may be obtained by oxidation of petroleum materials. An example of a particularly suitable asphalt is a roofing grade material obtained by air-blowing a petroleum residuum; this asphalt has a softening point falling within the range of 215°–235° F., a Cleveland open cup flash point above 550° F. and an ASTM penetration of more than 0.8 mm. at 32° F. and not more than 4.00 mm. at 115° F.

The thermoplastic composition comprising the defined ether and polymer generally contains between about 18 and 40 percent of the polymer. (In this specification and claims all percentages are by weight.)

For many uses a simple thermoplastic composition consisting only of one of the polymers and one of the defined ethers is suitable. Often the most rigid military specifications for ammonium nitrate solid propellants require the presence of an adjunct plasticizer. (It is to be understood that the thermoplastic composition used as a binder may contain in addition to the polymer the defined ether and an adjunct plasticizer various amounts of other additives which serve certain purposes in the manufacture of the propellant grain or in improving operational characteristics of the propellant grain.) In general a thermoplastic composition containing adjunct plasticizer will contain between about 18 and 40 percent of the polymer.

The adjunct plasticizers are in general oxygen containing organic materials. Broadly any of the known plasticizers for one or more of the defined polymers may be used to some extent in combination with the polymer and the defined ether. The requirements of a particular binder may eliminate from use one or more of these adjunct plasticizers. In addition to oxygen many of the better adjunct plasticizers contain nitro groups. Examples of several broad classes of materials suitable for use as adjunct plasticizers are set out hereinafter along with illustrative compounds from each of these broad classes. It is to be understood that the list set out hereinafter is not limiting and is intended to be merely a guidepost for the workers in this art. Suitable adjunct plasticizers are:

(A) Di-lower alkyl-phthalates, e.g., dimethyl phthalate, dibutyl phthalate, dioctyl phthalate and dimethyl nitrophthalate.
(B) Nitrobenzenes, e.g., nitrobenzene, dinitrobenzene, nitrotoluene, dinitrotoluene, nitroxylene, and nitrodiphenyl.
(C) Nitrodiphenyl ethers, e.g., nitrodiphenyl ether and 2,4-dinitrodiphenyl ether.
(D) Tri-lower alkyl-citrates, e.g., triethyl citrate, tributyl citrate and triamyl citrate.
(E) Acyl tri-lower alkyl-citrates where the acyl group contains 2–4 carbon atoms, e.g., acetyl triethyl citrate and acetyl tributyl citrate.
(F) Glycerol-lower alkanoates, e.g., monoacetin, triacetin, glycol tripionate and glycerol tributyrate.
(G) Lower alkylene-glycol-lower alkanoates wherein the glycol portion has a molecular weight below about 200, e.g., ethylene glycol diacetate, triethylene glycol dihexoate, triethylene glycol dioctoate, polyethylene glycol dioctoate, dipropylene glycol diacetate, nitromethyl propanediol diacetate, hydroxyethyl acetate and hydroxy propyl acetate (propylene glycol monoacetate).
(H) Dinitrophenyl-lower alkyl-lower alkanoates, e.g., dinitrophenyl ethylacetate, and dinitrophenyl amyloctoate.
(I) Lower alkylene-glycols wherein the molecular weight is below about 200, e.g., diethylene glycol, polyethylene glycol (200), and tetrapropylene glycol.
(J) Lower alkylene-glycol oxalates, e.g., diethylene glycol oxalate and polyethylene glycol (200) oxalate.
(K) Lower alkylene-glycol maleates, e.g., ethylene glycol maleate and bis-(diethylene glycol monoethyl ether) maleate.
(L) Lower alkylene-glycol diglycolates, e.g., ethylene glycol diglycolate and diethylene glycol diglycolate.
(M) Miscellaneous diglycollates, e.g., dibutyl diglycollate, dimethylalkyl diglycollate and methylcarbitol diglycollate.
(N) Lower alkyl-phthalyl-lower alkyl-glycollate, e.g., methyl phthalyl ethyl glycollate, ethyl phthalyl ethyl glycollate and butyl phthalyl butyl glycollate.
(O) Di-lower alkyloxy-tetraglycol, e.g., dimethoxy tetraglycol and dibutoxy tetraglycol.
(P) Nitrophenyl ether of lower alkylene glycols, e.g., dinitrophenyl ether of triethylene glycol and nitrophenyl ether of polypropylene glycol.

*Example 1*

In this example di(dinitrophenyl) dipropylene glycol ether was made from 2 mols of isomers of dinitrochlorobenzene and 1 mol of dipropylene glycol. A 50 percent solution of sodium hydroxide in water containing 2 mols of the caustic was added to the dinitrochlorobenzene glycol solution in a flask provided with a reflux condenser. The temperature of the reaction flask was maintained at between 90° C. and 100° C. while the caustic solution was being added. The material in the flask was diluted with water to precipitate a solid material. This solid material was washed with hot water to remove sodium dinitrophenolate by-product of the reaction. The final di-(dinitrophenyl) dipropylene glycol ether product was a viscous oil.

*Example 2*

The ether of Example 1 was admixed with lacquer grade cellulose acetate analyzing about 55 percent acetic acid. One cellulose acetate composition contained 25 percent of the polymer and 75 percent of the ether of Example 1; the composition was thermoplastic with a melting point on the order of 130° C. At room temperature the composition was rubbery and had fair tensile strength. A composition containing 20 percent of cellulose acetate polymer and 80 percent of the ether was a rubbery thermoplastic material of good tensile strength at room temperature and had a melting point of 125° C.

*Example 3*

Three compositions were made up consisting of cellulose acetate polymers, the ether of Example 1 and an adjunct plasticizer. The ingredients and the amount of each ingredient in these particular compositions is set out below. All of these compositions were thermoplastic having a melting point on the order of 110°–115° C. with rubbery characteristics and good tensile strength at room temperature.

(A) Cellulose acetate 25%, ether 37% and glycol diglycolate 38%.
(B) Cellulose acetate 30%, ether 35% and dimethyl phthalate 35%.
(C) Cellulose acetate 30%, ether 35% and dinitrophenyl ethyl acetate 35%.

*Example 4*

In this example 2 mols of dinitrochlorobenzene and 1 mol of propylene glycol (propandiol-1,2) were added to a flask provided with a reflux condenser and a stirrer. Two mols of sodium hydroxide as a 50 percent aqueous solution were added to the flask while the temperature was maintained at 100° C. After the sodium hydroxide had been added the reaction zone was maintained at about 100° C. for 2 hours. At the end of this time water was added to the flask to precipitate a solid material. This solid material was washed with hot water. Then it was dissolved in benzene and recovered from the benzene by recrystallization. The material from the benzene step had a melting point of 126°–128° C. and consisted of a mixture of mono (dinitrophenyl) propylene glycol ether and di(dinitrophenyl) propylene glycol ether. A portion of the mixed ether product was dissolved in 95 percent ethanol. The ethanol solution was cooled until a precipitation was completed. The precipitate consisted of the di(dinitrophenyl) propylene glycol ether; the mono-ether remains in ethanol solution.

*Example 5*

Thermoplastic compositions were formed using both the mixed ethers and the pure di-ethers. Examples of thermoplastic compositions all of which had melting points in the region of 105°–135° C. and good tensile characteristics are set out below.

(A) 75% of the mixed ethers of Example 4 and 25% of cellulose acetate butyrate.
(B) 80% of the mixed ethers and 20% of lacquer grade cellulose acetate.
(C) 35% of the mixed ethers, 35% of dimethylphthalate and 30% of cellulose acetate.
(D) 37% of the di-ether of Example 4, 38% of dimethylphthalate and 25% of cellulose acetate.

*Example 6*

An ammonium nitrate composition was prepared by forming a fluid mixture of cellulose acetate, mixed ethers of Example 4 and dimethyl phthlate at about 130° C. This mix was cooled to about 100° C. and ammonium nitrate, finely ground carbon and an inorganic catalyst added. The plastic mass could be molded, extruded or cast into shapes. The composition is suitable for use as JATO propellant. The composition consisted of cellulose acetate, 6.6%; mixed ethers of Example 4, 7.7%; dimethyl phthalate, 7.7%, ammonium nitrate 73.0%; carbon, 2% and catalyst 3%.

Thus having described the invention, what is claimed is:

1. A thermoplastic composition consisting essentially of di(dinitrophenyl)-R-glycol ether where R is selected from the class consisting of propylene and dipropylene and between about 18 and 40 percent of a polymer selected from the class consisting of polyvinyl butyral, polyvinyl chloride, polyvinyl acetate, a copolymer of styrene-acrylonitrile, polystyrene, polyacrylonitrile, asphalt and cellulose esters of acids from the group acetic, propanoic and butyric.

2. A thermoplastic composition consisting of about 35 percent of cellulose acetate and 65 percent of di(dinitrophenyl)-dipropylene glycol ether.

3. A thermoplastic composition consisting of about 25 percent of cellulose acetate, 37 percent of di(dinitrodiphenyl) propylene glycol ether and 38 percent of dimethylphthalate.

4. A thermoplastic composition consisting of about 30 percent of cellulose acetate, 35 percent of di(dinitrophenyl)-dipropylene glycol ether, and 35 percent of di-(dinitrophenyl)-dipropylene glycol ether, and 35 percent of dinitrophenyl ethyl acetate.

References Cited in the file of this patent
UNITED STATES PATENTS

| | | |
|---|---|---|
| 2,130,990 | Coleman et al. | Sept. 20, 1938 |
| 2,503,207 | Moyle | Apr. 4, 1950 |
| 2,715,112 | Stanton et al. | Aug. 9, 1955 |
| 2,755,267 | Finholt | July 16, 1956 |